United States Patent
Liu et al.

(10) Patent No.: US 10,109,304 B1
(45) Date of Patent: Oct. 23, 2018

(54) PERPENDICULAR MAGNETIC RECORDING (PMR) WRITER WITH THINNER SIDE SHIELD

(71) Applicant: Headway Technologies, Inc., Milpitas, CA (US)

(72) Inventors: Ying Liu, San Jose, CA (US); Yuhui Tang, Milpitas, CA (US); Jiun-Tlng Lee, Sunnyvale, CA (US); Yue Liu, Fremont, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 15/654,199

(22) Filed: Jul. 19, 2017

(51) Int. Cl.
*G11B 5/127* (2006.01)
*G11B 5/31* (2006.01)
*G11B 5/11* (2006.01)
*G11B 5/235* (2006.01)

(52) U.S. Cl.
CPC .............. *G11B 5/315* (2013.01); *G11B 5/112* (2013.01); *G11B 5/1278* (2013.01); *G11B 5/235* (2013.01); *G11B 5/3116* (2013.01); *G11B 5/3163* (2013.01); *G11B 5/3169* (2013.01)

(58) Field of Classification Search
CPC ... G11B 5/1278; G11B 5/3116; G11B 5/3163; G11B 5/315
USPC ........................ 360/125.13, 125.3; 29/603.18
See application file for complete search history.

(56) References Cited

U.S. PATENT DOCUMENTS

| | | | | |
|---|---|---|---|---|
| 8,970,992 B2* | 3/2015 | Benakli | ................. | G11B 5/3116 360/319 |
| 9,123,359 B1 | 9/2015 | Han et al. | | |
| 9,299,367 B1* | 3/2016 | Tang | ..................... | G11B 5/127 |
| 9,343,087 B1 | 5/2016 | Zhou et al. | | |
| 9,361,912 B1* | 6/2016 | Liu | ....................... | G11B 5/187 |
| 9,406,317 B1* | 8/2016 | Tang | ..................... | G11B 5/3116 |
| 9,508,364 B1* | 11/2016 | Tang | ....................... | G11B 5/112 |
| 2005/0141137 A1* | 6/2005 | Okada | ....................... | G11B 5/11 360/122 |
| 2010/0302680 A1* | 12/2010 | Hirata | ...................... | G11B 5/11 360/119.04 |
| 2012/0140356 A1* | 6/2012 | Horide | ................. | G11B 5/1278 360/75 |
| 2015/0002959 A1* | 1/2015 | Basu | ........................ | G11B 5/11 360/125.03 |

* cited by examiner

*Primary Examiner* — Jefferson Evans
(74) *Attorney, Agent, or Firm* — Saile Ackerman LLC; Stephen B. Ackerman

(57) ABSTRACT

A PMR (perpendicular magnetic recording) head includes a tapered main write pole (MP) with a beveled face and thin, laterally disposed side shields (SS) that do not fully extend along the sides on the write pole in the down-track direction. Denoting the down-track thickness of the side shields as SSt, that thickness satisfies 0<SSt<(MPt+LGt), where MPt is the thickness of the main pole and LGt is the thickness of the leading edge gap beneath the leading edge of the write pole. The thin side shields maintain the write bubble while producing a better Bits Per Inch-Tracks Per Inch (BPI-TPI) tradeoff line.

15 Claims, 4 Drawing Sheets

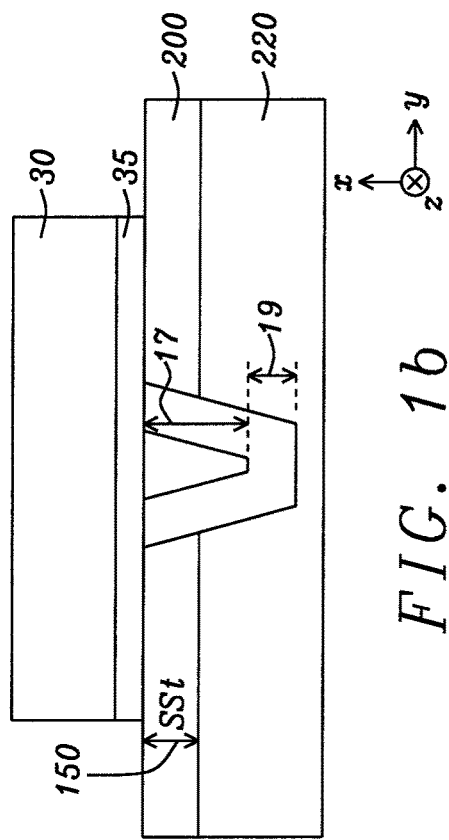
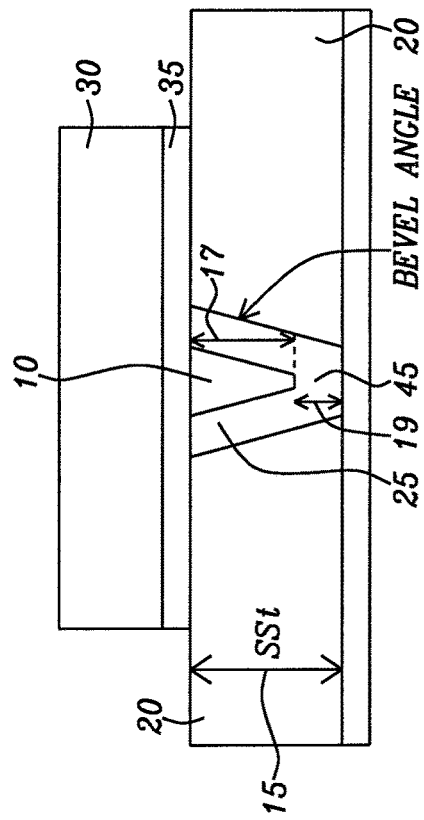

PERPENDICULAR MAGNETIC RECORDING (PMR) WRITER WITH THINNER SIDE SHIELD

BACKGROUND

1. Technical Field

This disclosure relates generally to a writer used in perpendicular magnetic recording (PMR) and particularly to the design of shields that improve their performance.

2. Description

Current Perpendicular Magnetic Recording (PMR) writer designs typically employ a main pole surrounded by fully wrapped around shields, i.e., two symmetric laterally disposed side shields (SS) sandwiched above and below by a trailing shield (TS) (above) and leading shield (LS) (below). This shield configuration is designed and fabricated to improve both the field gradients in the down track and cross track directions as well as to improve the ATE (adjacent track erasure) performance. The prior art teaches several different shield designs to accomplish various types of improved writer performance.

FIG. 1(a) schematically shows the ABS (air bearing surface) of a rather typical prior art PMR writer with fully wrapped around shields. For ease of description, we introduce an x,y,z system of coordinates, with x in the vertical, or "down-track" direction, y in the horizontal or "cross-track" direction and z directed perpendicularly to the ABS plane and away from that plane into the figure. The elements of this FIG. 1(a) design include the write pole (10), whose trapezoidal face is shown here, two laterally disposed, mirror symmetric side shields (20), a trailing shield (30) here shown "above" the pole and a leading shield (40) shown "below" the pole. Here "leading" designates the direction into which a rotating recording medium moves relative to the ABS of the writer. The pole is separated from the shields by various gaps, typically filled with non-magnetic material. The gaps are denoted side gaps (SG) (25), leading gap (LG) (45) and write gap (WG) (35). We will discuss FIG. 1(a) further below.

In today's PMR writer design, the side shield (SS) plays an important role with respect to overwrite (OW) and dBER (cross-track bit error rate) performance. Greater SS volume and higher $M_s$ (saturation magnetization) can help maintain the "write bubble" (shape of the region of the disk into which the magnetic field can write data) and improve dBER, but there is a trade-off between OW and BER (on-track bit error rate). Since the trend in PMR writer design demands higher OW protection with higher TPI (tracks per inch), a new SS design is called for. The prior art discloses various attempts to deal with these problems, for example, U.S. Pat. No. 9,343,087 (Zhou et al.); U.S. Pat. No. 9,123,359 (Han et al.) and U.S. Pat. No. 9,361,912 (Liu et al.). However the present disclosure will provide an approach that is superior to what is taught in these and other prior arts.

SUMMARY

It will be the objects of the present disclosure to provide a PMR (perpendicular magnetic recording) writer with side shields shaped in a manner that maintains dBER while the magnetic flux provided by the writer produces both improved OW protection and BER performance and maintains the desired write bubble shape.

These objects will be achieved by the design and fabrication of a PMR writer with side shields having a new design that incorporates a thinner shape.

Returning now to FIG. 1(a) and, as well, to FIG. 1(b), there is shown side-by-side schematic illustrations of an ABS cross-sectional view of a PMR writer. For definiteness we take the ABS cross-sectional coordinates as x in the vertical direction (down-track direction) and y in the cross-track direction. Coordinate z is directed inward and away from the ABS. Further, the upper portion of the MP will be referred to as the trailing side (just below the trailing shield) and the lower portion of the MP will be referred to as the leading side.

FIG. 1(a), as discussed above, shows a typical PMR writer, such as those found in the prior art, with side shields (20) symmetrically disposed (as layers) to either side of the main write pole, MP, (10). Double-ended arrow (15) indicates the thickness, denoted SSt, of the SS layer in the x-direction, which is the down-track direction along a recording medium that would be positioned beneath the writer. In typical, i.e. "normal" prior art writers, the side shield thickness, SSt, is the sum of two thickness, the thickness of the main pole, MPt (in the x direction), indicated by double-ended arrow (17) plus the thickness (LGt) of the leading gap (45), which is indicated by double-ended arrow (19), also in the x-direction. We note also that the side shield layers (20) extend away from the ABS in the z-direction to define a throat height (typically between approx. 400 nm and 700 nm) and extend symmetrically, laterally, within the ABS plane in the y-direction. The throat height of the LET/LS is typically between approx. 100 nm to 300 nm.

Referring now to FIG. 1(b) there is shown an ABS view of a PMR writer that includes the thin side shields (SS) (200) of the present disclosure. In the writer of FIG. 1(b), the side shields (200) are thinner in the x-direction than those (20) in FIG. 1(a). Specifically, the side shield thickness SSt is within the range: 0<SSt<(MPt+LGt), as is indicated by the double-ended arrow (150). Thus, the thickness (150) of the new side shields, SSt, is less than the sum of the main pole thickness, MPt, (17) plus the leading gap thickness, LGt (19). Layer (220) represents the leading edge taper (LET) layer and the leading shield LS layer together. For clarity we note that the taper angle is in the y-z plane as is not seen in this drawing.

As can be seen by comparing FIG. 1(a) to FIG. 1(b), the new SS (200) in FIG. 1(b) has lost significant volume on the leading edge side of the MP, as compared to SS (20) of FIG. 2(a). However, shield volume is maintained on the trailing side of the MP. Because of the bevel angle, BA, of the MP, the write bubble and dBER are primarily influenced by the trailing side of the MP. Note that the bevel is in the ABS plane, relative to the y-axis, and can range from approximately 5 to 30 degrees. Thus, the new design of FIG. 1(b) will benefit from leading edge SS volume reduction, and achieve higher OW and BER, while write bubble and dBER, which are affected by the portion of the MP still surrounded by SS material, will be maintained. For even further protection, the SS can be formed of high saturation (e.g., $M_s$=24 kG) material to improve TPI and dBER-BER, which will result in a better trade-off that in prior art writers.

Referring to FIG. 2(a)-2(c) there are shown three sets of simulation results to indicate the changes in: (a) magnetic field strength ($H_y$) on the recording media (in Oe); (b) side shield return field on recording media and (c) trailing shield return field on recording media. Each figure shows three data points, corresponding to a normal writer (i.e., prior art with normal thickness side shields) (circle); the present writer with thin side shields (square) and the present writer with high $M_s$ thin side shields. The new writer with ordinary $M_s$ material shows an improvement of the trailing shield return, while the SS return field remains the same, indicating an improvement in BER with no dBER tradeoff. Note that the more negative the return field, the sharper is the writing transition. The tradeoff is basically the product of BPI×TPI. If the gain in BPI/TPI is much higher than the loss in TPI/BPI, then the overall performance is considered a net gain. By forming the side shields with high $M_s$ material, the SS return field becomes more negative while the TS return field is relatively small and $H_y$ is lower. This places the new design on an improved BPI-TPI tradeoff line.

BRIEF DESCRIPTION OF THE DRAWINGS

FIGS. 1(a) and 1(b) are schematic representations of an ABS view a PMR writer showing, in (a) a prior art writer having "normal" side shields and, in (b), a PMR writer having a design with thinner side shields.

DETAILED DESCRIPTION

Fabrication of the PMR writer described above is accomplished using standard photolithographic processes.

Figure 2A:
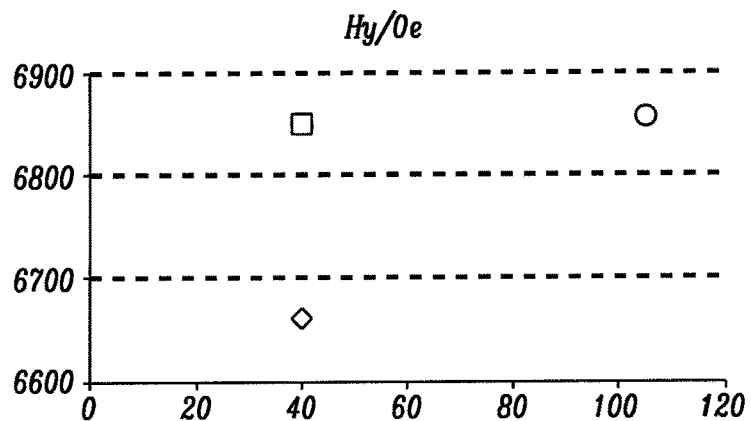
FIGS. 2(a), 2(b) and 2(c) are the results of simulations showing, in (a), magnetic field strength on the recording media ($H_y$), in (b) the side shield return field on the recording media and, in (c), the trailing shield return field on the recording media. Each figure shows the simulated results of three different configurations, normally shaped side shields (small circle), new SS design with lower $M_s$ (small square) and new SS design with higher $M_s$ shield material (small diamond).
Figure 2B:
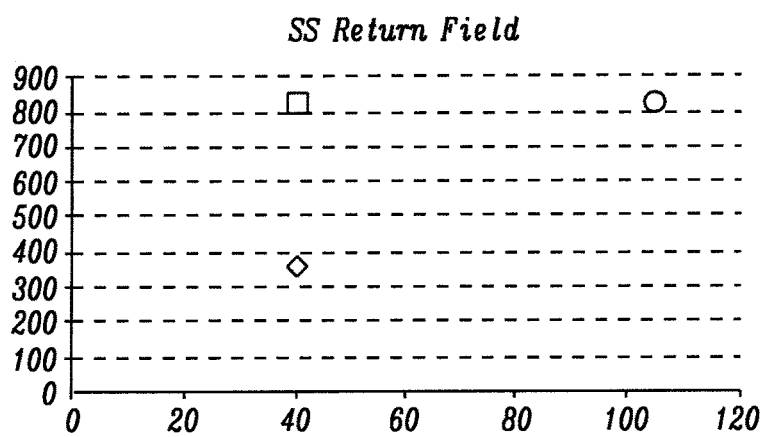
Figure 2C:
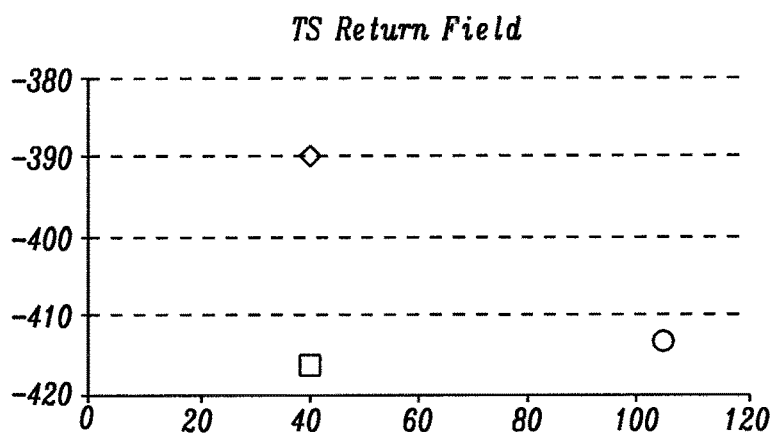
Figures 3A, 3B:
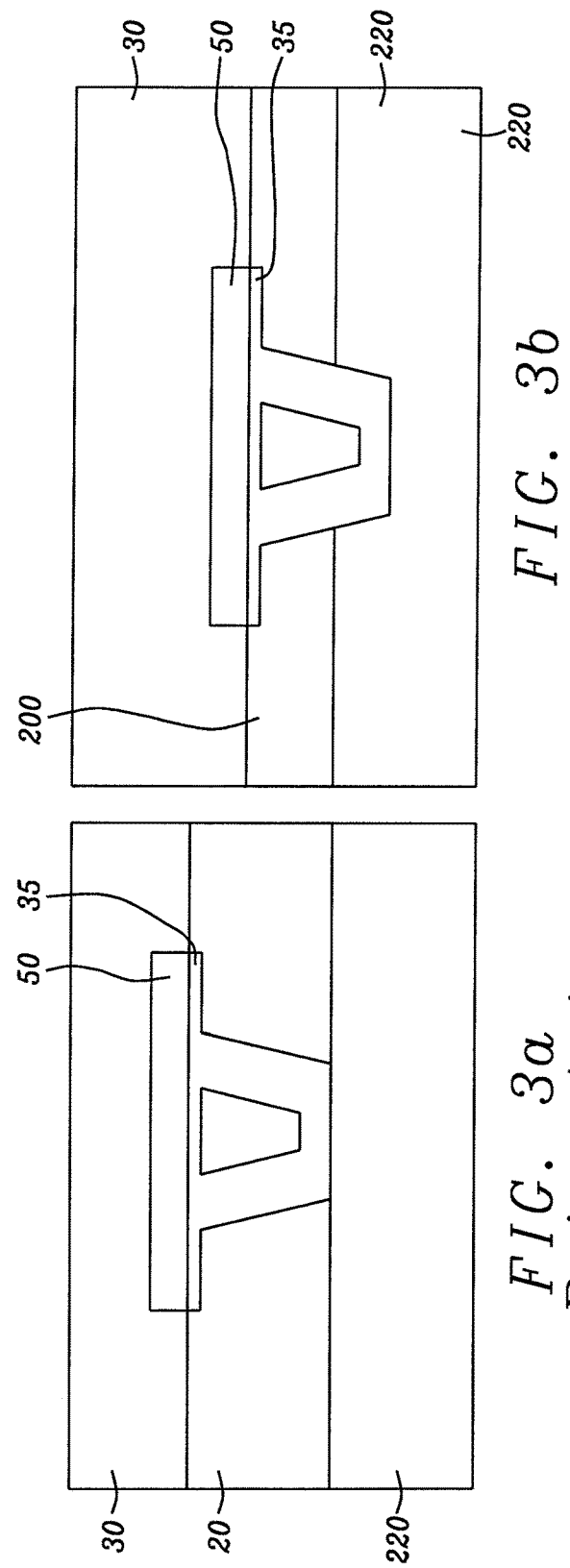
FIGS. 3(a) and 3(b) are each a schematic representation of an ABS cross-sectional view of a PMR writer having an additional layer of high $M_s$ shield material inserted within the leading edge of a trailing shield immediately conformal with a write gap (WG) layer. The PMR writer of 3(a) is prior art that has normal thickness side shields while the PMR writer of (b) has the thinner side shields of the present design.

Referring to FIG. 3(a) there is shown schematically a prior art PMR writer that is quite similar to the prior art writer shown in FIG. 1(a) with the exception of an additional layer of high $B_s$ material (50) that is formed, optionally, within the leading edge of the trailing shield (30) immediately above the write gap layer (35). This layer of high saturation magnetic material ($B_s$=24 kG), such as CoFe) lines the leading edge of the trailing shield and forms an upper boundary of the write gap (35). This additional layer has been used successfully in some current (i.e., prior art) designs as an alternative to FIG. 1(a) and the device performance with this layer in place is helped equally by the use of the thinner side shields as is the device performance that does not include this extra trailing shield portion, as shown in FIG. 1(b).

By contrast, the saturation fields of the remaining shields are $B_s$ between approximately 10 and 19 kG, formed by a magnetic material such as NiFe. In the remainder of this disclosure we will call this the additional layer (50) the leading edge layer of the trailing shield. As in the previous prior art PMR design shown in FIG. 1(a), the beveled main pole (10) is flanked symmetrically by side shields (20) which extend in the x-direction from the leading edge of the trailing shield to the trailing edge of the leading edge taper (LET) layer (220).

Figure 4A:
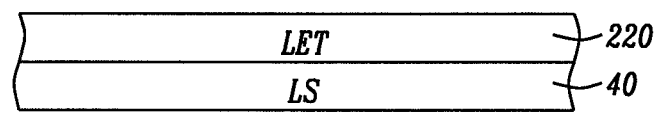
FIG. 4(a)-4(c) are schematic illustrations showing three successive steps in creating the PMR design of either FIG. 1(b) or FIG. 3(b).
Figure 4B:
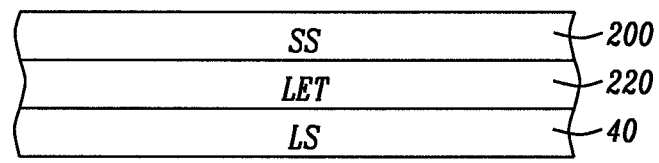
Figure 4C:
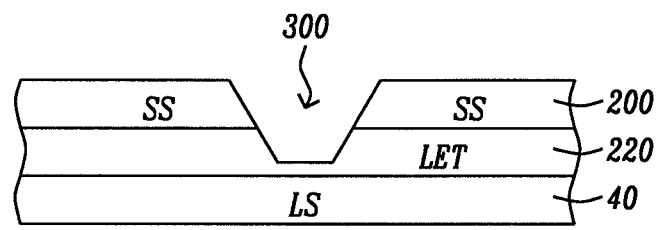

Referring next to schematic FIG. 3(b) there is shown a PMR writer with the additional trailing edge shield layer (50) that implements the thin side shields of the present design. However, as in FIG. 3(a), there is an additional layer of high $B_s$ material (50) that is formed, optionally, within the leading edge of the trailing shield (30) immediately above the write gap layer (35). Referring to FIGS. 4(a)-4(c) The formation of either the design of FIG. 1(b) or FIG. 3(b) proceeds as follows.

(FIG. 4(a)): the LET layer (220) is deposited on a leading shield layer (40) or other suitable substrate. The LET layer is formed of a magnetic material, such as NiFe, of $B_s$ between approximately 10 and 19 kG. This layer will eventually be patterned to support the plating of the main pole.

(FIG. 4(b)): a thin SS layer (210) is deposited upon the LET layer (220). This SS layer can have a $B_s$ between approximately 10 and 19 kG or, if further strengthening of the shield effect is desired, a higher $B_s$ material, of approximately 24 kG, such as CoFe can be used. This SS layer will be patterned into two symmetric portions, so that each SS extends back along the sides of the tapered pole for a defined throat height. The SS layer must be of sufficient depth to ultimately have a throat height that is greater than that of the LET layer.

(FIG. 4(c)): a photolithographic mask (not shown) is used to pattern an etch that is sufficiently strong to penetrate completely through the SS layer and partially into the LET layer, creating, thereby, a beveled trench (300) that extends into, but not through, the LET layer. The partially etched LET layer is now covered above by two oppositely disposed symmetric side shield segments. The depth of this trench, into which the main pole is then deposited (e.g., by plating), will ensure that the leading edge of the main pole (MP) will have a greater depth than the boundary between the SS layer and the LET.

Note that fabrication steps (FIG. 4(a))-(FIG. 4(c)) described above will result in a thickness of the side shields, SSt, obeying 0<SSt<(MPt+LGt), i.e., that the thickness of the SS is less than the sum of the thicknesses of the main pole and the leading edge gap. Although not shown in these figures, note also that the throat height of the SS is comparable to that in conventional layers, but may be greater than that of the LET or LS layers, so the shielding effect of the SS extends back from the ABS further than that of the LET or LS layers. Note that the additional formation of the trailing shield, either with or without the additional layer, would proceed identically once the thin side shields have been formed.

As is understood by a person skilled in the art, the present description is illustrative of the present disclosure rather than limiting of the present disclosure. Revisions and modifications may be made to methods, materials, structures and dimensions employed in forming and providing a PMR writer thin side shields that provide an improved BPI-TPI tradeoff line, while still forming and providing such a structure and its method of formation in accord with the spirit and scope of the present disclosure as defined by the appended claims.

What is claimed is:

1. A write head for perpendicular magnetic recording (PMR) having an ABS (air bearing surface) in an x-y plane and comprising;

a trailing shield;

a main pole formed beneath said trailing shield;

a leading edge taper (LET) layer formed beneath said main pole; and a leading shield (LS) formed beneath said LET; wherein said main pole has a region in an y-z plane that tapers towards said ABS, whereby said main pole terminates in said ABS and forms therein a substantially trapezoidal pole face by said intersection with said ABS, said pole face having a bevel angle and said pole face having a maximum distance from a leading edge to a trailing edge denoted MPt; and said leading edge of said main pole is separated from said LET by a leading edge gap (LG) having a leading edge gap thickness denoted LGt; wherein a pair of mirror-symmetric side shields (SS) are laterally disposed about said main pole, wherein each said side shield extends in a −x direction from a leading edge of said trailing shield to have a thickness SSt, wherein a leading edge of each said side shield forms a contiguous contact along a trailing edge of said LET;

wherein said LET is formed on a leading edge shield (LS) layer; and wherein each said SS extends away from said ABS in a z-direction for a distance denoted a throat height; and wherein said LET and said LS layers each extend away from said ABS in a z-direction for a distance denoted a throat height.

2. The write head of claim 1 wherein a leading edge of said trailing shield has an additional trailing shield layer formed therein, wherein said additional trailing shield layer is formed of a magnetic material that has a value of a magnetic saturation field $B_s$ that is greater than that of said trailing shield.

3. The write head of claim 2 wherein said additional trailing shield layer is conformal with said write gap layer and is a layer of substantially uniform thickness in an x-direction.

4. The write head of claim 1 wherein said trailing shield, said side shields, said LET and said leading edge shield are all formed of magnetic material having a $B_s$ of between approximately 10 and 19 kG (kiloGauss).

5. The write head of claim 1 wherein said trailing shield, said LET and said leading edge shield are all formed of magnetic material having a $B_s$ of between approximately 10 and 19 kG and said side shields are formed of magnetic material having a $B_s$ that is approximately 24 kG.

6. The write head of claim 1 wherein said side shields have a throat height that is greater than that of said leading edge shields and said leading edge taper layer.

7. The write head of claim 6 wherein said side shields have a throat height between approximately 400 nm and 700 nm.

8. The write head of claim 6 wherein said leading shield and said leading edge taper layer each have a throat height of between approximately 100 nm and 300 nm.

9. The write head of claim 1 wherein said MP has a bevel angle of between approximately 5 and 30 degrees.

10. A method of forming a PMR writer comprising:

providing a substrate suitable for plating a main pole and surrounding shields;

forming on said substrate a leading shield (LS) layer;

forming on said leading shield layer a leading edge taper (LET) layer;

forming on said leading edge taper layer a side shield (SS) layer;

using a photolithographic process to produce a patterned etch, etching completely through said SS layer and partially into said LET layer, thereby producing two oppositely disposed symmetric segments of said SS layer above said LET layer;

using a plating process, plate said main pole into said trench, whereby said main pole is surrounded by oppositely disposed segments of said side shield layer.

11. The method of claim 10 wherein said leading shield layer, said leading edge taper layer and said side shield layer, are all formed of magnetic material having a $B_s$ of between approximately 10 and 19 kG (kiloGauss).

12. The method of claim 10 wherein said trailing shield layer, said leading edge taper layer and said leading edge shield layer are all formed of magnetic material having a $B_s$ of between approximately 10 and 19 kG and said side shield layer is formed of magnetic material having a $B_s$ that is approximately 24 kG.

13. The method of claim 10 wherein said side shield layer has a throat height that is greater than that of said leading edge shield layer and said leading edge taper layer.

14. The method of claim 13 wherein said side shield layer has a throat height between approximately 400 nm and 700 nm.

15. The method of claim 13 wherein said leading shield layer and said leading edge taper layer each have a throat height of between approximately 100 nm and 300 nm.

* * * * *